(12) United States Patent
Häfner

(10) Patent No.: US 7,479,606 B2
(45) Date of Patent: Jan. 20, 2009

(54) GRAVIMETRIC METERING DEVICE WITH INDEPENDENTLY SUSPENDED ROTATING IMPELLER BLADES

(75) Inventor: Hans W. Häfner, Aichach-Walchshofen (DE)

(73) Assignee: Pfister GmbH, Augsburg (DE)

( * ) Notice: Subject to any disclaimer, the term of this patent is extended or adjusted under 35 U.S.C. 154(b) by 0 days.

(21) Appl. No.: 11/665,584

(22) PCT Filed: Oct. 17, 2005

(86) PCT No.: PCT/EP2005/011125

§ 371 (c)(1),
(2), (4) Date: Apr. 7, 2008

(87) PCT Pub. No.: WO2006/040186

PCT Pub. Date: Apr. 20, 2006

(65) Prior Publication Data

US 2008/0217071 A1    Sep. 11, 2008

(30) Foreign Application Priority Data

Oct. 17, 2004 (DE) ........................ 10 2004 050 709

(51) Int. Cl.
*G01G 11/00* (2006.01)

(52) U.S. Cl. .................... 177/116; 222/77; 73/861.351; 73/218

(58) Field of Classification Search ............ 73/861.351, 73/861.352, 861.354, 218; 222/55, 56, 77; 177/54, 62, 65, 83, 84, 116
See application file for complete search history.

(56) References Cited

U.S. PATENT DOCUMENTS

| 4,155,486 | A | * | 5/1979 | Brown | 222/197 |
| 4,378,198 | A | * | 3/1983 | Pettersson | 416/140 |
| 5,289,724 | A | * | 3/1994 | Hafner | 73/861 |
| 5,394,747 | A | * | 3/1995 | Hafner | 73/218 |
| 5,505,589 | A | * | 4/1996 | Bergey | 416/147 |
| 7,032,859 | B2 | * | 4/2006 | Mohr | 244/122 |

FOREIGN PATENT DOCUMENTS

| EP | 0 530 797 | 3/1993 |
| WO | WO 98/53283 | 11/1998 |
| WO | WO 99/27331 | 6/1999 |

* cited by examiner

*Primary Examiner*—Randy W Gibson
(74) *Attorney, Agent, or Firm*—Knobbe Martens Olson & Bear LLP

(57) ABSTRACT

The invention aims at obtaining a simplified and compact construction of a gravimetric metering device (1) for bulk products, comprising a large discharge section per activation zone (A) and transfer zone (F) for supplying the bulk product into a rotor (2) rotated in a horizontal plane, with transfer tools (3) (I,E.; impeller blades) extending mainly in the radial direction, an emptying station (E) offset relative to the transfer zone (F), and a weighing platform (W) arranged therebetween in the peripheral direction, provided with a force measuring device (20) for determining the weight of the bulk product transported. The invention is characterized in that the transfer tools (3) are mounted so as to be uncoupled from one another in at least one degree of freedom.

10 Claims, 3 Drawing Sheets

Figure 1:
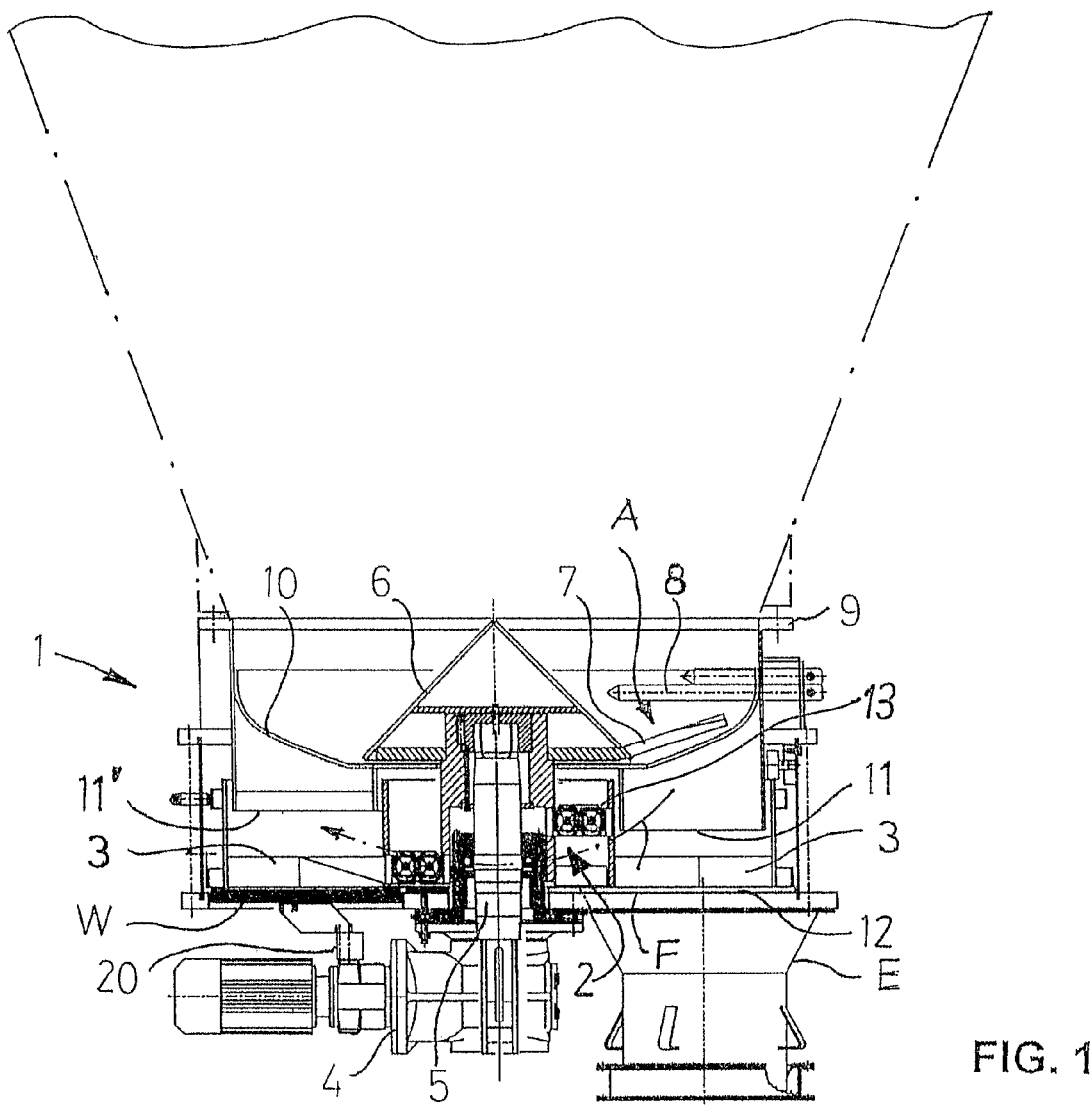

GRAVIMETRIC METERING DEVICE WITH INDEPENDENTLY SUSPENDED ROTATING IMPELLER BLADES

The invention refers to a gravimetric metering device for bulk products in accordance with the generic part of patent claim 1.

From DE-C-32 17 406 a device is known for continuous gravimetric metering of pourable material which is supplied over a charge opening into pockets of a rotor which is rotatable about a vertical axis and is discharged by applying pressurized air through a discharge opening arranged off-set in rotational direction of the rotor in respect of the charge opening. The housing of the rotor is pivotally supported about an essentially horizontal axis and is connected to a force measuring device arranged remote to this axis. The horizontal axis is extending through the centres of elastic connection members such that forces which occur upon the loading of the metering apparatus can be compensated. With such a metering device, a rather high accuracy can be achieved, however it requires a relatively large space occupied and exhibits a relatively small discharge cross section for the bulk product. Besides, it is also relatively complex, in particular because of the required axle design which must be implemented exactly for the avoidance of misalignments, in order to avoid reactions to the balancing result and thus the dosing accuracy. Something similar applies to a rotary disk metering device in accordance with WO 93/05372 of the Applicant.

Further, the Applicant already suggested in EP-A-0 530 797 to design the rotor as a measuring disk which is divided into several equally dimensioned sectors being slightly vertically movable independently from each other. In this case, the respective force measuring device is arranged below the individual sectors and determines the mass of the material respectively located on a sector when a sector is passing. However, due to the partitioning in three or more sectors and the junctions necessary thereby, this metering device involves a relatively high cost of construction with likewise relatively small discharge cross section.

Partially, this applies also to WO 99/27331 where Applicant suggests the configuration of the measuring section as a graduated plate ring with the bulk material being centrally fed, whereby the compact metering device is easy to install below bulk material bins. In this case, however, there are still required relatively complex radial slots and joints as well as a plurality of weighing cells to be the load measuring devices.

Accordingly, it is the object of the invention to provide a gravimetric metering device having an especially simple, compact design, a large discharge cross section for the bulk product and a high measuring accuracy.

According to the invention, this object is achieved by a gravimetric metering device comprising the features of claim 1. Preferred embodiments of the gravimetric metering device according to the invention are indicated in the subclaims.

Uncoupling the transfer tools in at least one degree of freedom, in particular in the height or vertical direction, results in a high measuring accuracy, since spurious forces are kept away from the weighing platform. Besides, the cost of construction is considerably simplified since, in principle, only one weighing cell and associated evaluation electronics are necessary. Hereby, the respective momentary weight can be detected both in an absolute (by summation of the measured values of the force measuring device) and relative respect to the transfer zone and feeding station, respectively, or the emptying station. Thus, for adherence to a special momentary conveying strength, the rotor can be controlled in its peripheral speed in order to maintain a predetermined dosage rate at the emptying station. Thereby, the measuring accuracy per time unit is kept particularly reliable. The central discharge cone having at least one activator arm and circulating together with the transfer tools of the rotor advantageously ensures a safe bulk product discharge from the bin arranged above it via a large discharge cross section. The bulk product is thus drawn by the transfer tools directly off the entire abutting cross section of large area of the bulk product bin via the stationary discharge tray, is transported across the weighing sector (weighing platform and bent bridge, respectively) and immediately emptied at the drop zone and allotted into the process.

Figure 2:
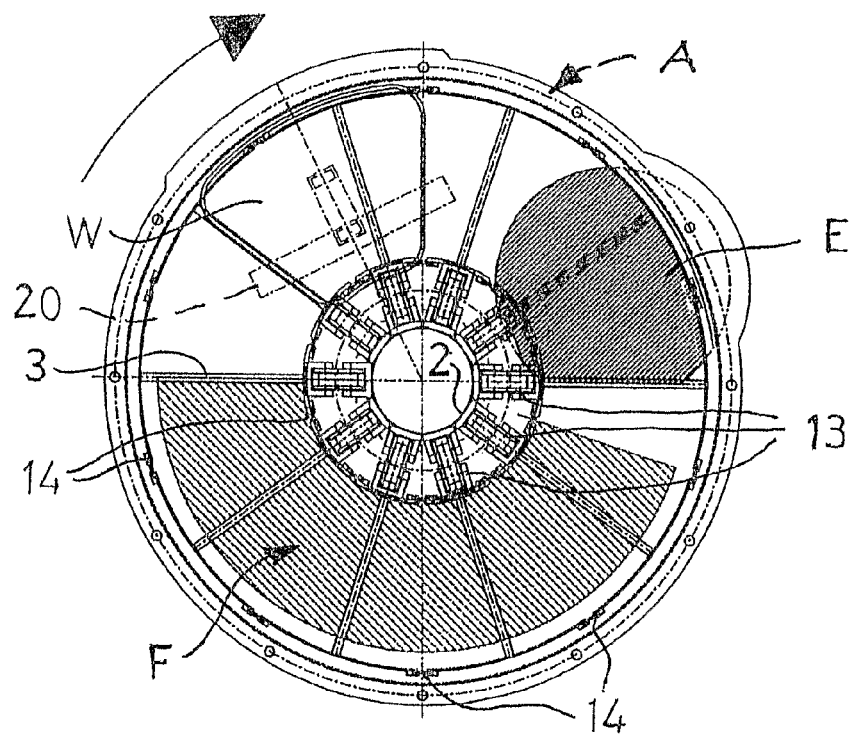
Figure 3:
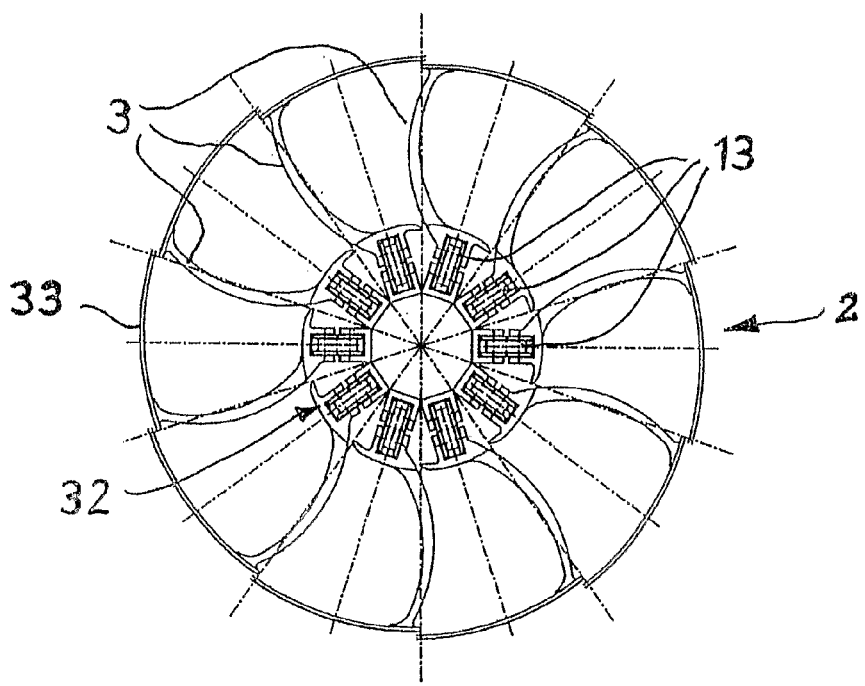

Further features and advantages of the device according to the invention will become apparent from the following description of embodiments with reference to the drawings. There is shown in:

FIG. 1 a schematic sectional view of an embodiment of the metering device;

FIG. 2 a plan view on the device of FIG. 1 along the measuring plate plane;

FIG. 3 a similar device as in FIG. 2 in a modified execution; and

Figure 4:
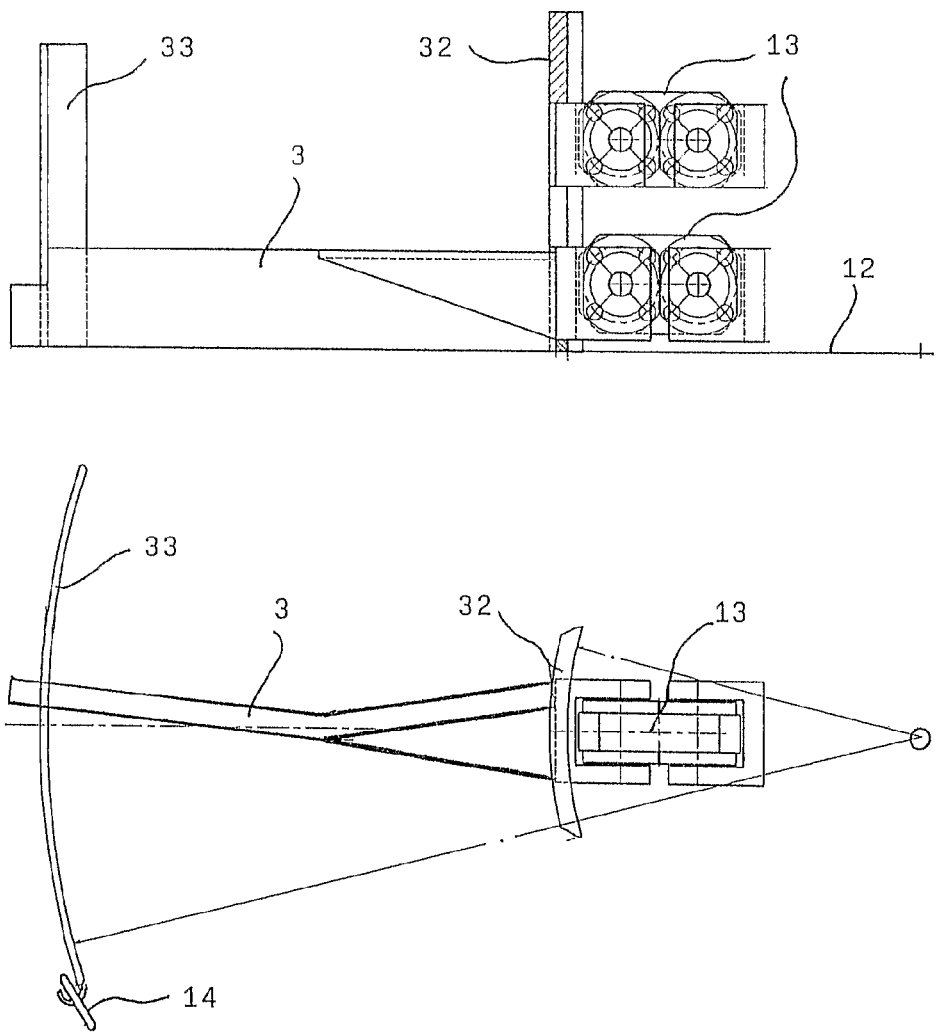

FIG. 4 a further embodiment of a transfer tool in an enlarged view.

FIGS. 1 and 2 show a specific embodiment of a metering device 1 according to the invention, comprising a horizontally rotating rotor 2 rotating over a weighing platform W with a load cell or force measuring device 20. The rotor 2 is driven by a motor 4 with an adjustable or controlled rotational speed. The shaft 5 driven thereof is connected with a central discharge cone 6 and has stirrer arms 7 for activation, which extend radially outward. Here, the metering device 1 is fastened at a bin (indicated in dot and dash lines) or silo by means of a flange 9, so that no supporting frame or similar carrying structures are necessary. Besides, a needle slide gate 8 is provided to cut off material supply and can be inserted over a tub-shaped cover 10. This cover 10 extends approximately over half the circumference of the rotor 2 (in FIG. 1: here, into the drawing plane; in FIG. 2 in the upper half), wherein, however, the cover 10 is not visible because of the cut line running scarcely above the rotor 2, but is only indicated by reference arrow A. Essentially, cover 10 covers the weighing station W and the emptying station E, while a transfer zone F remains exhibited.

By this direct connection with the bin arranged above it, an activation zone A of approximately 160° and a transfer zone F of approximately 200° angular pitch is formed (cf. also FIG. 2), so that the bulk product supply practically extends across the entire 360° range, as indicated in FIG. 1 by the curved arrow F. As illustrated in FIG. 2, an emptying station E in the form of a withdrawal pit is stationarily arranged downstream a weighing platform W, opposite the transfer zone F, so that the rotor 2 is emptied, before it arrives at the transfer zone F again. The bulk product is thereby transported with radially aligned transfer tools 3 on a discharge tray 12, which is continuously formed, except for an opening at the emptying station E and a flexible storage at the edge of the weighing platform W.

The formation of a continuous bulk material stream within the rotor 2 is being promoted by exterior and interior boundaries 33 and 32 in ring form (cf. also FIGS. 3 and 4). The exterior elevated boundary 33 and, if necessary, the interior boundary 32 can be connected to their respective neighbouring segments (cf. also FIG. 4) by means of chain links as coupling elements 14 or similar slightly flexible elements in order to thus form the bulk material withdrawn in the course of the rotary movement to become the bulk material stream.

As particularly illustrated in FIG. 2, the rotor 2 of this embodiment comprises segment-like partitioned transfer tools 3 all the way round, which are rotated by means of the shaft 5 (cf. FIG. 1). While FIG. 2 shows a force measuring device 20 of a bar-shaped form, this can be replaced by another variation of a force measuring device. After supply at the activation zone A and transfer zone F the bulk product is transported toward a bent bridge or here a sector-type weighing platform W with load cell 20 which thus provides a load-proportional measuring signal. If different loadings result in changes in the bulk material stream, this is detected by evaluation electronics.

For the improvement of the transportation effect, the substantially radially extending transfer tools 3 uncoupled from each other are preferentially bent shovel-like in the radial direction (cf. FIG. 3) or angled or cranked, as illustrated in the plan view of FIG. 4. Corresponding to the measuring signal of the weighing cell 20, the evaluation electronics not shown can immediately initiate suitable counter-measures to re-adjust the bulk material stream; for example an increased bulk product withdrawal from the bin into the transfer zone F can be carried out by increasing the rotational speed (via the controlling of the motor 4). This transfer zone F takes about half the rotor area (as evident from FIG. 2), while the opposite half (in FIG. 2 the upper half above the weighing platform W and the emptying station E as well as a following tare weighing section, where applicable) is covered at a distance by the tub-shaped cover 10. Thus, the activation zone A is formed thereabove, since it is there where the circulating stirrer arms 7 activate the bulk material and lead it to the transfer zone F. A charging height screen 11 is provided at the lower surface of the cover 10, ascending in the directions of rotation or transfer (cf. reference numeral 11') to limit in height and equalize, respectively, the likewise increasing bulk material stream.

During the dosing process, the rotor 2 runs along the transfer zone F and is loaded with bulk material due to the activation in the activation zone A and withdrawal movement from the bin. Thereby, the bulk material is equalized to form a bulk material stream, by means of the boundary 32/33 in its width and by means of the screens 11/11' in its height. Thus, by rotating (in FIG. 2: in the clockwise direction) further feeding takes place continuously. In this case, the load cell 20 located underneath the sector-type weighing platform W detects the mass of the bulk product transported across, before it is released at the emptying station E. Upon further rotation, the bulk product then enters the discharge region forming the emptying station E (FIG. 2, on the right), in which the material is released through a circular opening in the discharge tray 12, if necessary also with exhaustion.

It should be noted that the dropping of the material in the discharge region does not affect the mass determination for the following bulk material stream, since the transfer tools 3 are uncoupled from each other by joints 13 and coupling elements 14, thus each being able to move slightly, separately from one another, in particular in the height direction, in order not to act upon the weighing platform W. For this, the joints 13 are formed at the hub of the rotor 2, surrounding shaft 5 for example in kind of double wishbones (cf. upper illustration in FIG. 4) as known from vehicle technology as an axle suspension. Translatory shifting joints at the region near to the centre of each transfer tool 3 are also possible, wherein rubber metal elements can be imagined as the elasto-statical joints as well.

Above, the individual phases of the dosing process have been described. Of course, the process is continuous, with a further portion of the rotor 2 each being in the respective next phase upon rotation (in the clockwise direction according to FIG. 2). If the transfer tools 3 are completely emptied at the station E, in particular with well flowable bulk material or additional exhaustion, the above-mentioned phase of the kind of a tare determination may also be omitted. However, tare weighing of the transfer tool 3 just emptied at the drop zone can be conducted on a case-by-case basis with a second weighing sector (similar to the above-described weighing platform) to control a so-called net dosage.

The momentary rotational angular position or angular velocity of the rotor 2 is determined by any means known, for example by associated sensors (not shown). Thus, the instant or angle of rotation can be determined, at which the rotor 2 is in the position shown in FIG. 2 (and each further rotated position). At this time, the respective value received is determined and the actual mass conveyed is determined by forming the difference of the associated values and is then added or integrated.

If it is desired to convey a predetermined mass, such mass is determined by accumulating or adding the determined mass values. With a continuous gravimetric metering, the values determined in such a way are set into relation to the time or rotational speed of the rotor 2. A controlling signal for the motor 4 may then be derived therefrom in order to maintain a desired value for the throughput or a desired output, respectively, as well as a control signal to the motor 2 for temporary increase or reduction of the feed amount.

FIG. 3 illustrates a modification of the transfer tools 3 of the metering device 1, wherein different to FIG. 2 the transfer tools 3 are formed in a bent shape. The shaft 5 driven by the motor 4 is activating the rotor hub, which makes rotate this superimposed transfer organ in the form of a pin feed wheel with radial bars uncoupled from each other and elevated walls 32/33, whereby the bulk product coming from the container is continuously withdrawn. This type of construction allows a small overall diameter as well as a compact design so that this metering device is simple to incorporate in present mixture systems or the like.

In FIG. 4, a bar-like transfer tool 3 is illustrated in an enlarged side view (above) and plan view (below). Unlike the previous constructions, the present transfer bar is formed in an angled manner and extends somewhat beyond the exterior elevation 33 in order to obtain a clearing effect within the housing. The remaining components are characterized by analogue reference symbols as mentioned above, a chain link being also shown as the coupling element 14 to establish a relative "loose" connection (i.e., having at least one degree of freedom) to the next transfer tool 3.

The weighing or load cells may be comprised of conventional force measuring devices 20 which permit a mass determination of the bulk material stream resting on a bent bridge or the weighing platform W, the load cells 20 being stationarily fixed underneath the discharge tray 12. As regards the electronic metering control and evaluation electronics of the metering device according to the invention, it is referred to the references mentioned in the introduction.

The invention claimed is:

1. A gravimetric metering device for bulk products, having an activation and transfer zone for supplying bulk material into a rotor rotated in a horizontal plane with transfer tools extending mainly in the radial direction, an emptying station offset relative to the transfer zone, and a bent bridge or weighing platform arranged therebetween in the direction of rotation, provided with a force measuring device for determining the weight of the bulk product transported,
   wherein the transfer tools are mounted so as to be uncoupled from one another in at least one degree of freedom.

2. A metering device according to claim 1, wherein the transfer tools are uncoupled from each other in two degrees of freedom.

3. A metering device according to claim 1, wherein at least one bearing or joint per transfer tool is provided for uncoupling.

4. A metering device according to claim 1, wherein a flexible element, in particular a rubber metal element is provided for the uncoupling of the transfer tools.

5. A metering device according to claim 1, wherein a circulating discharge cone is provided above the transfer tools, said cone comprising in particular at least one rotary-driven stirrer arm.

6. A metering device according to claim 1, wherein the transfer tools are connected to form a ring, by means of interior and/or exterior coupling elements.

7. A metering device according to claim 1, wherein the transfer tools are limited to the outside and/or the inside by an elevation.

8. A metering device according to claim 1, wherein the transfer tools—seen in plan view—exhibit a bent or cranked form in the radial direction.

9. A metering device according to claim 1, wherein the transfer tools overlap at their interior and exterior perimeters and are connected by means of interior/exterior articulated brackets as coupling elements.

10. A metering device according to claim 1, wherein a tare weighing of the emptied transfer tools is provided downstream the emptying station.

* * * * *